2,749,953
APPARATUS FOR CARRYING AND SELECTIVELY RENDERING OPERABLE A PLURALITY OF TOOLS

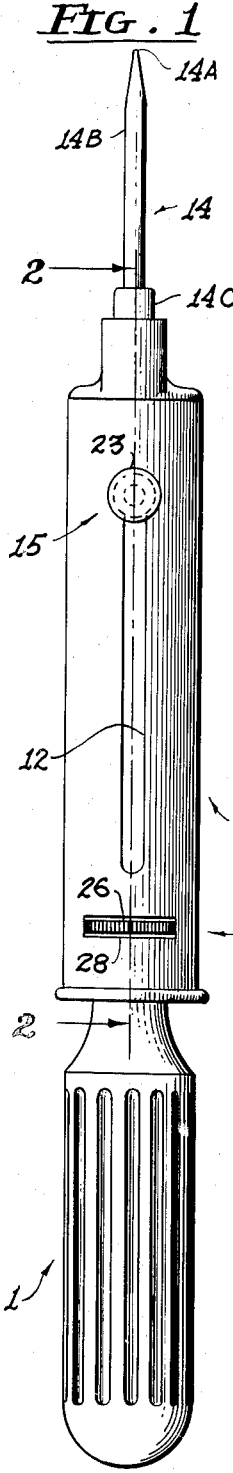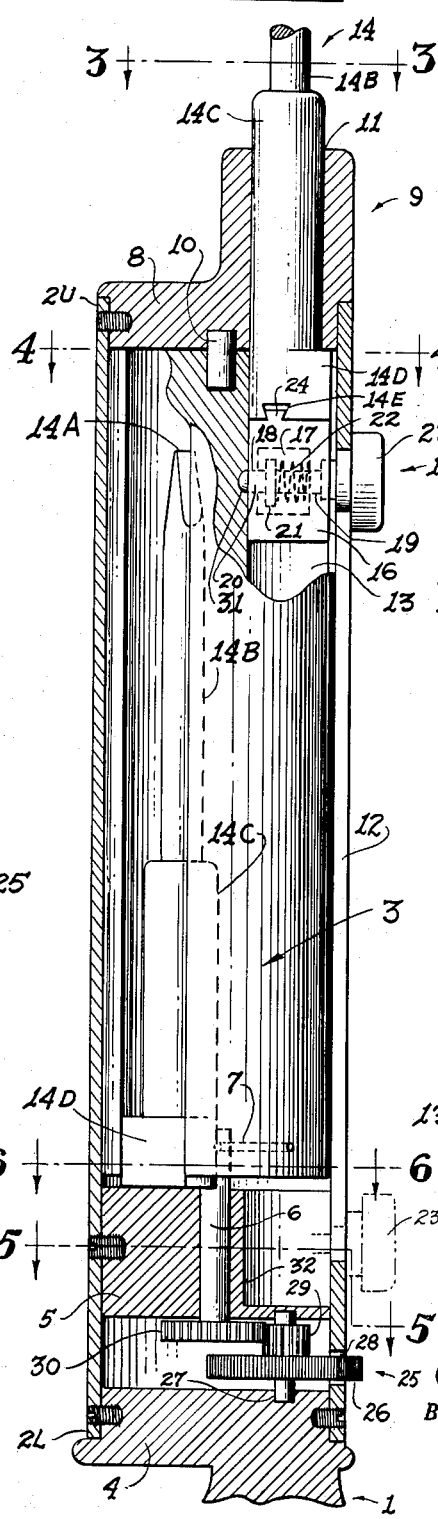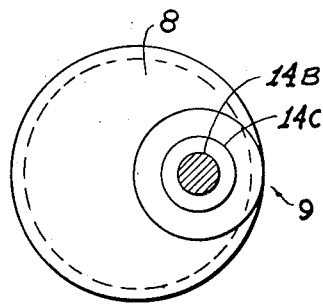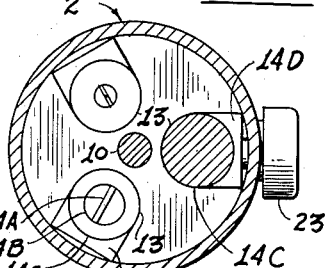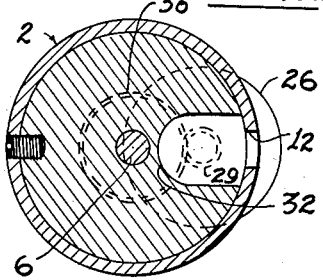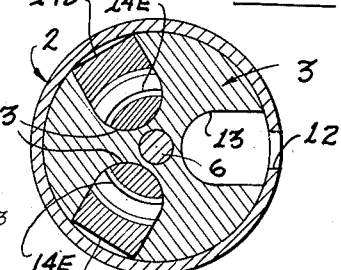
June 12, 1956 — G. W. RUNDLE — 2,749,953
APPARATUS FOR CARRYING AND SELECTIVELY RENDERING OPERABLE A PLURALITY OF TOOLS
Filed June 17, 1954
INVENTOR.
GEORGE W. RUNDLE
BY R. W. Hodgson United States Patent Office 2,749,953
Patented June 12, 1956

George W. Rundle, Los Angeles, Calif.

Application June 17, 1954, Serial No. 437,514

2 Claims. (Cl. 145—63)

Generally speaking, the present invention relates to the tool art (the word, tool, being used in a broad sense). More particularly, it pertains to novel apparatus adapted to carry (usually therein) a plurality of tools (usually, small longitudinal tools such as screw-drivers, files, manicure tools, and the like) in a manner whereby any selected one of said plurality of tools may be rendered operable by being advanced and locked in an extended operative position with respect to an actuating handle (usually aligned therewith).

I am aware of the fact that various prior art devices adapted for cooperation with a selected one of a plurality of tools have been invented and developed heretofore. I am also aware of the fact that certain of these have been so constructed as to also comprise a container for any of the plurality of tools which are not carried by the device in operative position. However, all such prior art devices known to me, have major disadvantages of one type or another.

For example, one such prior art device comprises an enlarged hollow handle having a removable closure member at one end thereof and having a selectively openable and closable chuck means (or other similar engaging means) at the other end thereof. The hollow handle means is adapted to carry therein a plurality of tools such as screw-drivers, or the like, any selected one of which can be removed therefrom by opening the closure means; said selected tool then being adapted to be engaged in the chuck means and locked therein whereby to effectively provide a screw-driver. This type of prior art device has at least one serious disadvantage—the fact that the handle acts merely as a container for the removable tools which, therefore, are frequently removed from within the handle and mislaid or lost, thus rendering the entire device inoperable.

Generally speaking, the apparatus of the present invention includes actuating handle means and longitudinal turret means controllably rotatably mounted with respect to the actuating handle means around an imaginary longitudinal axis of rotation of said turret means (usually laterally offset from an imaginary axis of rotation of said handle means). The present invention also includes a plurality of longitudinal tools effectively carried by the turret means for simultaneous rotation therewith around said longitudinal axis of rotation of said turret means (usually along a virtually circular path having an effective radius virtually equal to the lateral distance between the longitudinal axes of rotation of the turret means and the handle means); said plurality of longitudinal tools being slidably cooperable with respect to the turret means for selective slidable extending and retracting movement with respect thereto in a direction virtually parallel with respect to said longitudinal axis of rotation of said turret means (usually in virtual alignment with the longitudinal axis of rotation of the handle means). The cooperative relationship of the elements is such that said turret means can be effectively selectively rotated with respect to said handle means into any desired one of a plurality of predetermined positions and whereby any selected one of said tools can be selectively extended with respect to said turret means and said handle means into operative position.

A preferred generic form of the present invention may be provided with locking means selectively cooperable with any selected longitudinal tool for controllably and releasably locking said tool in extended operative position.

A preferred generic form of the present invention may include a longitudinal hollow housing carried by the handle means and encompassing the turret means and the plurality of tools (exclusive of any tool in operative position), said housing being provided with egress means positioned to allow egress of an operative portion of a tool which is in operative position, and being provided with egress means positioned to allow egress of the locking means and operative movement thereof from the exterior of the housing.

From the above description of the basic and preferred generic forms of the present invention, it will be apparent to those skilled in the art that the hereinbefore-mentioned prior art disadvantages are virtually entirely eliminated and overcome in and through the use of the present invention.

For example, it is obvious that the tools carried by the device of the present invention can never be lost or misplaced because they cannot be removed from within the housing—the nearest thing to this being the selective partial extension of a selected one of said tools into operative position with respect to the remainder of the device.

With the above points in mind, it is an object of the present invention to provide a novel, multiple-tool-carrying device capable of selectively extending and locking in operative position any desired one of the multiple tools carried by the device.

It is a further object of the present invention to provide a device of the character set forth in the preceding object, which is of simple, cheap, virtually foolproof, compact construction adapted for easy portability.

Other and allied objects will be apparent to those skilled in the art after a careful perusal, examination, and study of the accompanying illustrations, the present specification and the appended claims.

To facilitate understanding, reference will be made to the hereinbelow-described drawings, in which:

Fig. 1 is an elevational view of one illustrative embodiment of the present invention;

Fig. 2 is an enlarged fragmentary view showing portions of the device illustrated in Fig. 1, as viewed along the plane 2—2 in Fig. 1, and showing other portions in elevation;

Fig. 3 is a view taken on plane 3—3 in Fig. 2 and comprises a plan view except for the horizontal section of the tool;

Fig. 4 is a downward, horizontal sectional view on the plane 4—4 in Fig. 2;

Fig. 5 is a downward, sectional view taken along the line 5—5 in Fig. 2; and

Fig. 6 is a downward, horizontal sectional view taken on the plane 6—6 in Fig. 2.

Generally speaking, the present invention includes actuating handle means and longitudinal turret means controllably rotatably mounted with respect to the actuating handle means around an imaginary longitudinal axis of rotation of said turret means (usually, laterally offset from an imaginary axis of rotation of said handle means).

In one form of the present invention, a longitudinal hollow housing means may be carried by the handle means in encompassing relationship with respect to the turret means (and tools to be subsequently described).

In the specific example illustrated, the handle means is indicated generally at 1, the housing means is indicated generally at 2 and the turret means is indicated generally at 3. In the form illustrated the upper end of handle 1 is provided with a cylindrical portion 4 which has fixedly fastened therearound the lower end 2L of the cylindrical housing 2. Spaced above the cylindrical handle portion 4 is a cylindrical member 5 also fixedly fastened within the wall of the housing 2. A shaft 6 rotatably extends vertically through the center of the cylindrical member 5 into engagement with the longitudinal turret means 3 and is fastened with respect thereto by a fastening means 7 whereby rotation of the shaft 6 will effectively rotate the turret means 3 within the housing 2.

In the specific example illustrated, the upper end 2U of the cylindrical housing 2 is fixedly fastened around the circular portion 8 of a housing end cap indicated generally at 9. Said cylindrical portion 8 carries a shaft or pin 10 extending down into a vertically directed centrally disposed aperture in the upper end of the turret means 3 whereby to, together with the lower shaft 6, effectively rotatably mount the turret means 3 for rotation about an imaginary longitudinal axis extending through the centers of the shafts 6 and 10.

In the specific form illustrated, the housing end cap 9 (which effectively forms part of the housing) is provided with egress means positioned to allow egress of an operative portion of a tool. This egress means comprises an aperture 11. Also, in the specific form illustrated, the housing 2 is provided with egress means positioned to allow egress of locking means (to be described hereinafter) and operative movement thereof. This egress means comprises a longitudinal vertically directed slot 12 in the wall of the housing 2.

Incidentally, it should be noted that the vertically arranged cylindrical turret means 3 is provided with tool engaging means taking the form of three vertical apertures 13 symmetrically disposed around the vertical longitudinal axis of rotation of the turret 3.

Also, generally speaking, the present invention includes a plurality of longitudinal tools effectively carried by the turret means for simultaneous rotation therewith around the longitudinal axis of rotation of the turret means (usually, along a virtually circular path having an effective radius virtually equal to the lateral distance between the longitudinal axes of rotation of the turret means and the handle means); said plurality of longitudinal tools being slidably cooperable with respect to the turret means for selective slidably extending and retracting movement with respect thereto in a direction virtually parallel with respect to the longitudinal axis of rotation of the turret means (and usually in virtual alignment with the longitudinal axis of rotation of the handle means).

In the specific example illustrated, three such longitudinal tools taking the form of screw-drivers, indicated generally at 14, are provided. Each of the screw-drivers 14 comprises an operative end portion 14A, a shank portion 14B immediately behind the end portion 14A, an enlarged shank portion 14C connected to the lower end of the shank portion 14B and having a rectangular lateral extension 14D thereon, which engages and fits within the corresponding vertical aperture 13 within the turret 3 in a keyed manner. Each of the tools 14 is also provided at the bottom thereof, with an arcuate dovetailed groove 14E (the purpose of which will be described hereinafter).

The present invention may include locking means selectively cooperable with any selected longitudinal tool for controllably and releasably locking said tool in extended operative position. In the specific example illustrated, this locking means is indicated generally at 15 and comprises a vertically slidable member 16 having an inner chamber 17, a rear aperture 18 and an aligned front aperture 19; said apertures 18 and 19 carrying a shaft 20 therein having a collar 21 pressing against one end of a biasing spring 22, the other end of which abuts the inside of the outer wall of the vertically slidable member 16 in a manner normally biasing the shaft 20 inwardly. The outer end of the shaft 20 is connected, through the slot 12, to a manual actuation button 23 whereby the device can be slidably moved vertically along any selected one of the apertures 13 between the upper extreme position shown in solid lines shown in Fig. 2 and the lower extreme position indicated by the dashed lines in Fig. 2. The upper surface of the member 16 is provided with an arcuate engaging rib, tongue or dovetail, 24 which is adapted for selective engagement with the corresponding arcuate dovetail groove 14E at the lower end of any selected one of the tools 14. Such engagement is shown in Fig. 2.

Also generally speaking, the present invention may be provided with controllably operable rotary actuation means effectively cooperable with respect to the turret means for controllably rotating said turret means; said rotary actuating means being accessible from the exterior of the housing.

In the specific example illustrated, the rotary actuating means is indicated generally at 25 and comprises a manually operable frictional wheel 26 pivotally mounted by pin 27 with its periphery extending laterally through an aperture 28 in the wall of the housing 2. Positioned above the frictional wheel 26 and fastened thereto in concentric relationship with the pin 27 is a spur gear 29, which is in driving engagement with a second spur gear 30 concentrically fastened to the rotatable shaft 6 whereby manual rotation of the wheel 26 from the exterior of the housing will effectively rotate the shaft 6 and the turret 3 fastened thereto.

The operation of the device may be briefly described as follows:

The button 23 can be pulled outwardly against the action of the biasing spring 22 so as to allow the inner end of the shaft 20 to become disengaged from the locking hole 31 shown in Fig. 2. Then the entire slidable locking member 16 can be slidably moved from its uppermost extreme position, shown in Figs. 1, 2 and 4 in solid lines, into the lowermost extreme position, indicated in dashed lines in Fig. 2 where the shaft 20 will be virtually at the lower end of the slot 12 and the locking member 16 will lie in an aperture 32 in the member 5. This will, of course, retract the tool 14 downwardly through the hole and into the longitudinal aperture 13 in the turret 3 because of the engagement of the arcuate dovetailed groove 14E with the corresponding arcuate dovetailed rib 24. After this downward movement has occurred, the formerly extended tool 14 will lie entirely within the housing and within the aperture 13 in the turret 3. In other words, the tool is in inoperative position. Then, if the operator of the device desires to select a different screw-driver, he merely places his thumb in engagement with the wheel 26 and rotates it through 120° (this will usually be indicated by a visibly observable marking on the wheel 26). This 120° rotative movement of the wheel 26 will correspondingly rotate the turret 3 through 120°, and will effectively arcuately slidably disengage the dovetailed engagement of the tongue or rib 24 and the groove 14E of the tool which formerly was in operative position as shown in Figs. 1 and 2. This disengagement will allow said screw-driver, which formerly was in alignment with the aperture 11 in the housing end cap 9, and the aperture 32 in the member 5, to be rotated 120° (with the turret 3) into a completely inoperative position. At the same time another screw-driver 14 will be rotated into alignment with the apertures 11 and 32 and will have its arcuate dovetailed groove 14E slidably engaged with the arcuate rib or tongue 24 of the locking means 15. Then said locking means 15 can be upwardly slidably moved from the dashed line position shown in Fig. 2 into the solid line position shown in Fig. 2, thus extending the screw-driver into operative position with respect to the remainder of the device, and effectively locking it there by engagement of the shaft 20 in the locking hole 31. This operation may be repeated as often as desired, or the wheel 26 may be rotated more than 120° to provide any desired selection of screw-drivers.

It should be noted that, while I have illustrated the longitudinal tools of the present invention as comprising conventional screw-drivers, they may comprise Philips type screw-drivers (or other types of screw-drivers), files, socket wrenches (or other types of wrenches, such as Allan wrenches, or the like) or any of a variety of types of tools. Furthermore, the word "tool" as used herein is intended to be construed broadly and, in addition to the above, I intend it to include manicure and/or (pedicure) tools and the like to provide a very convenient complete manicure (or pedicure) apparatus.

Numerous modifications and variations of the present invention will occur to those skilled in the art after a careful study hereof. All such properly within the basic spirit and scope of the present invention are intended to be included and comprehend herein as fully as if specifically described, illustrated and claimed herein.

For example, the locking means may be modified substantially, as may the rotary actuating means. The housing may be modified substantially and, in certain forms of the present invention, may be eliminated entirely.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. Apparatus carrying a plurality of tools and cooperable for selectively rendering operable any of said plurality of tools, comprising: actuating handle means; longitudinal turret means controllably rotatably mounted with respect to the actuating handle means around an imaginary longitudinal axis of rotation of said turret means; said turret means being provided with a plurality of longitudinal tool-engaging means virtually parallel with respect to the longitudinal axis of rotation of said turret means; a plurality of longitudinal tools longitudinally slidably and non-rotatably engaging the plurality of longitudinal tool-engaging means of the turret means for simultaneous rotation therewith around said longitudinal axis of rotation of said turret means and for selective slidable extending and retracting movement with respect to said turret means in a direction virtually parallel with respect to said longitudinal axis of rotation of said turret means, whereby said turret means can be selectively rotated with respect to said handle means into any desired position and whereby any selected one of said tools can be selectively extended with respect to said turret means and said handle means into operative position, each of said longitudinal tools having an operative end portion and a rear end portion provided with first arcuate engaging means on the rear end thereof; tool positioning means provided with second arcuate engaging means selectively fastenable in a longitudinally connected manner with respect to the first arcuate engaging means on the rear end of any selected longitudinal tool by relative rotary movement of the turret means and said tool with respect to said tool positioning means, said tool positioning means being rotatably immobile with respect to the longitudinal axis of rotation of the turret means but being controllably longitudinally movable between a retracted position and an extended position for controllably longitudinally positioning said tool in extended operative position with respect to said turret means and said handle means, said tool positioning means including controllably operable locking means engagable with the turret means when said tool positioning means is in extended position for positively locking a tool in extended non-rotatable operative position with respect to the turret means and the handle means; a longitudinal hollow housing carried by the handle means and encompassing the turret means and the plurality of tools exclusive of any tool in operative position, said housing being provided with egress means adjacent an operative end thereof positioned off-center and in substantial alignment with the handle means to allow egress of an operative portion of a tool which is in an extended operative position, and being further provided with longitudinal access slot means positioned to allow protrusion of the tool positioning means for access thereto and to allow longitudinal operative movement thereof between said retracted position and said extended position and to allow controllable operation of said locking means from the exterior of said housing; and controllably operable rotary actuating means effectively cooperable with respect to the turret means for controllably rotating said turret means, said rotary actuating means being accessible from the exterior of the housing.

2. Apparatus carrying a plurality of tools and cooperable for selectively rendering operable any of said plurality of tools, comprising: actuating handle means; longitudinal turret means controllably rotatably mounted with respect to the actuating handle means around an imaginary longitudinal axis of rotation of said turret means, said turret means being provided with a plurality of longitudinal aperture means virtually parallel with respect to the longitudinal axis of rotation of said turret means; a plurality of longitudinal tools longitudinally slidably and non-rotatably carried by corresponding ones of the plurality of longitudinal aperture means of the turret means for simultaneous rotation therewith around said longitudinal axis of rotation of said turret means and for selective slidable extending and retracting movement with respect to said turret means in a direction virtually parallel with respect to said longitudinal axis of rotation of said turret means, whereby said turret means can be selectively rotated with respect to said handle means into any desired position and whereby any selected one of said tools can be selectively extended with respect to said turret means and said handle means into operative position, each of said longitudinal tools having an operative end portion and a rear end portion provided with first arcuate engaging means on the rear end thereof; tool positioning means provided with second arcuate engaging means selectively fastenable in a longitudinally connected manner with respect to the first arcuate engaging means on the rear end of any selected longitudinal tool by relative rotary movement of the turret means and said tool with respect to said tool positioning means, said tool positioning means being rotatably immobile with respect to the longitudinal axis of rotation of the turret means but being controllably longitudinally movable between a retracted position and an extended position for controllably longitudinally positioning said tool in extended operative position with respect to said turret means and said handle means, said tool positioning means including controllably operable spring-biased locking means laterally engageable with the turret means when said tool positioning means is in extended position for positively locking a tool in extended non-rotatable operative position with respect to the turret means and the handle means; a longitudinal hollow housing carried by the handle means and encompassing the turret means and the plurality of tools exclusive of any tool in operative position, said housing being provided with egress means adjacent an operative end thereof positioned off-center and in substantial alignment with the handle means to allow egress of an operative portion of a tool which is in an extended operative position, and being further provided with longitudinal axis slot means positioned to allow protrusion of the tool positioning means for access thereto and to allow longitudinal operative movement thereof between said retracted position and said extended position and to allow controllable operation of said locking means from the exterior of said housing; and controllably operable rotary actuating means effectively cooperable with respect to the turret means for controllably rotating said turret means, said rotary actuating means being accessible from the exterior of the housing.

References Cited in the file of this patent

UNITED STATES PATENTS

| | | |
|---|---|---|
| 148,888 | Kidder | Mar. 24, 1847 |
| 532,823 | Sanger | Jan. 22, 1895 |
| 641,230 | Rice et al. | Jan. 9, 1900 |
| 1,816,812 | Allison | Aug. 4, 1931 |
| 2,123,810 | Severin | July 12, 1938 |
| 2,503,007 | Steuck | Apr. 4, 1950 |